May 13, 1930.  C. GARDNER  1,758,252
VARIABLE SPEED TRANSMISSION MECHANISM
Original Filed Feb. 3, 1928  2 Sheets-Sheet 1
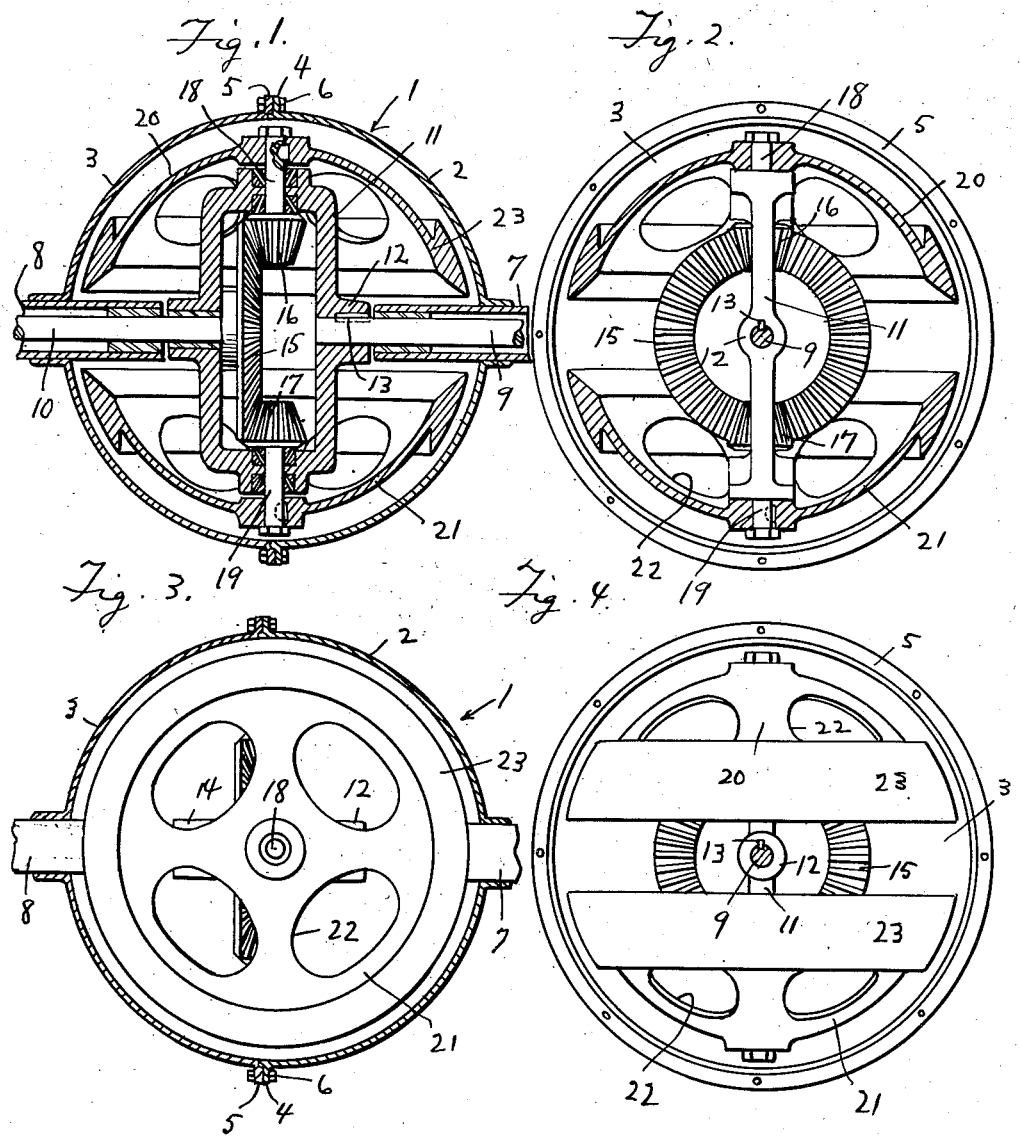
Inventor
*Cummings Gardner*
By *Clarence A. O'Brien*
Attorney May 13, 1930.　　　　C. GARDNER　　　　1,758,252
VARIABLE SPEED TRANSMISSION MECHANISM
Original Filed Feb. 3, 1928　　2 Sheets-Sheet 2
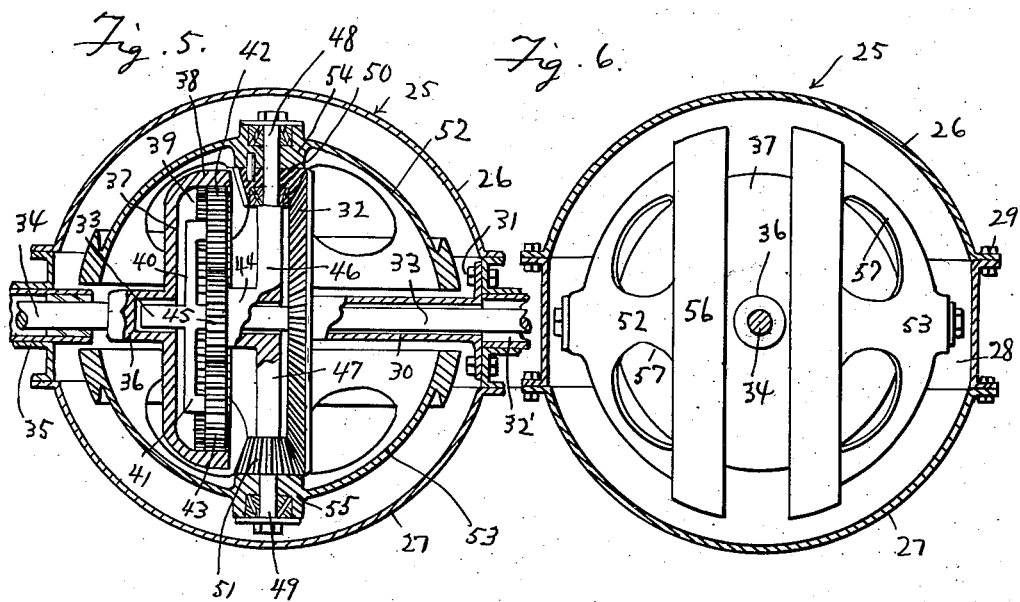
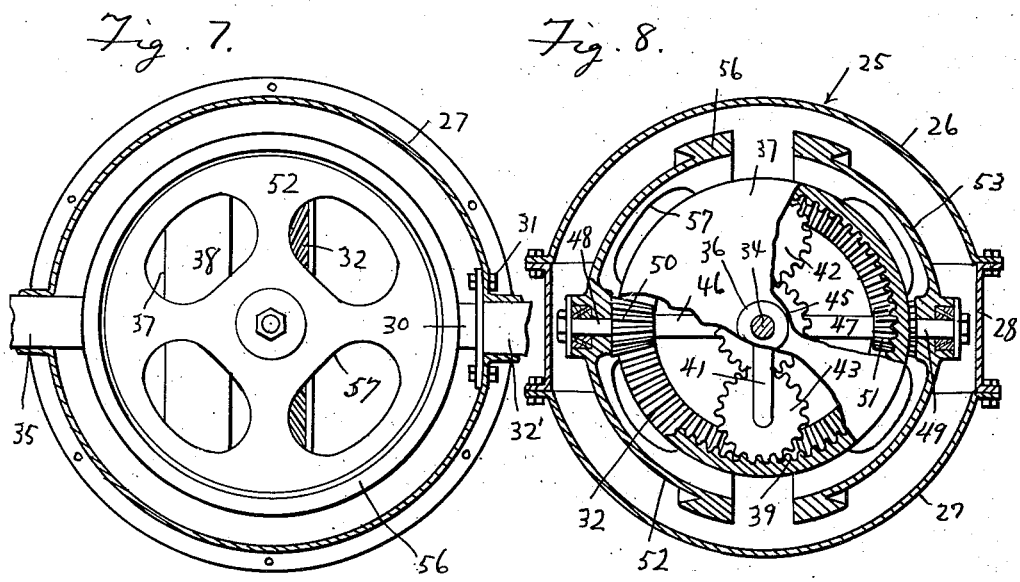
Inventor
Cummings Gardner
By Clarence A. O'Brien
Attorney Patented May 13, 1930

1,758,252

UNITED STATES PATENT OFFICE

CUMMINGS GARDNER, OF INGLEWOOD, CALIFORNIA, ASSIGNOR TO AUTOMATIC TRANSMISSION CORPORATION OF AMERICA, OF WILMINGTON, DELAWARE

VARIABLE-SPEED-TRANSMISSION MECHANISM

Application filed February 3, 1928, Serial No. 251,632. Renewed August 7, 1929.

The present invention relates to improvements in transmission mechanisms for association with a power driven shaft, and a drive shaft for actuating the former, means being provided for varying the speed at which the driven shaft will rotate coincident with the load placed thereon.

One of the important objects of the present invention is to provide a variable speed transmission mechanism which will be entirely automatic in its operation, thus obviating the employment of any mechanically operated gear shifting mechanism and also doing away with the necessity of having to provide a clutch.

Another important object of the invention is to provide a variable speed transmission mechanism that is particularly adapted to be associated with an automobile, the mechanism permitting the operator to at all times have complete control of the steering wheel regardless of the change of speed at which the automobile travels, the transmission mechanism being automatically operated to adapt the vehicle to travel at the proper rate of speed coincident with the load placed upon the driven shaft.

A still further object is to provide a variable speed transmission mechanism which will function without causing any vibration or sudden jerking such as frequently results when the gear shifting mechanism now generally in use upon automobiles is shifted from either a low to an intermediate or high speed or vice versa.

A further object resides in the provision of a variable speed transmission mechanism that is comparatively simple in construction, inexpensive, strong and durable, and further well adapted to the purpose for which it is designed.

Other objects and advantages of the invention will become apparent during the course of the following description.

In the accompanying drawings wherein like reference characters indicate corresponding parts throughout the several views:

Figure 1 is a vertical sectional view through one form of my improved transmission mechanism.

Figure 2 is a vertical sectional view therethrough.

Figure 3 is a top plan view, the casing being shown in section, and

Figure 4 is an end elevation, one of the semi-spherical sections of the casing being removed.

Figure 5 is a view similar to Figure 1 showing a modification of the transmission mechanism.

Figure 6 is an end elevation, the casing being shown in section.

Figure 7 is a top plan view, the casing being illustrated in section, and

Figure 8 is also an end elevation, parts being shown in section.

In the drawings wherein for the purpose of illustration is shown the preferred embodiment of my invention, with reference more particularly to Figures 1 to 4 inclusive, the numeral 1 designates generally a sectional casing that includes the complementary semi-spherical sections 2 and 3, respectively, the same being formed at their adjacent edges with laterally extending flanges 4 and 5 provided with registering openings to receive the securing bolts 6.

A tubular housing 7 has the rear or inner end thereof extending into the central portion of the section 2 of the casing 1, a similar housing 8 having its forward end extending through the center of the complementary section 3 in the manner as clearly shown in Figures 1 and 3 of the drawings. Each section is formed with an annular flange around the opening through which the respective tubular housing extends as also clearly shown in these particular figures of the drawings.

A drive shaft 9 is journaled for rotation in the housing 7 and the inner or rear end of the same extends into the casing 1 beyond the adjacent end of the housing. A driven shaft 10 is journaled for rotation in the diametrically opposed housing 8 and the forward end of the driven shaft extends beyond the adjacent end of the housing 8 for a purpose to be presently described.

The invention further comprehends the provision of a substantially rectangular shaped frame 11 that is disposed between the adjacent ends of the tubular housings 7 and 8. The forward side of the frame is formed with a hub 12 at its intermediate portion for receiving the projecting rear end of the drive shaft 9 and this frame is keyed on the drive shaft for rotation therewith through the medium of the key shown at 13 with reference more particularly to Figures 2 and 4 of the drawings.

The opposite side of the frame 11 is formed with a laterally extending sleeve 14 in which is journaled for rotation the forwardly projecting end of the driven shaft 10.

Secured on the forward end of the driven shaft 10 for rotation therewith is the relatively large bevel gear 15, the same being confined within the frame 11. Cooperating with the beveled gear 15 are the upper and lower beveled pinions 16 and 17, respectively, the same being also disposed within the frame 11 and secured on the inner opposed ends of the vertical stub shafts 18 and 19, respectively, that extend through the upper and lower ends respectively of the frame 11 and are journaled for rotation therein in suitable bearings shown in Figure 1.

Also forming a salient part of the present invention are the upper and lower fly wheels 20 and 21 respectively, each being of substantially semi-spherical shape. The upper end of the stub shaft 18 extends through the central portion of the upper fly wheel 20 and is keyed thereto for rotation therewith as shown in Figure 1. The lower end of the diametrically opposed stub shafts 19 is operatively associated with the lower fly wheel 21 in a similar manner.

These fly wheels enclose the frame 11 and the adjacent weighted edge portions of said members terminate in slight spaced relation with respect to the inner opposed ends of the tubular housings provided for the drive and driven shafts, respectively. Each of the fly wheels is provided with the cut out portions 22 to render the same light in weight and the weighted free edge portion of each member is shown at 23.

The operation of the variable speed transmission mechanism as disclosed in Figures 1 to 4 inclusive will now be briefly described. The drive shaft 9 is operatively associated at its forward end with a power plant, such as the internal combustion engine of an automobile or the like, and when the power from the engine of the automobile is applied to the shaft 9, the frame 11 disposed within the casing 1 will rotate or revolve on a horizontal axis as will also the fly wheels 20 and 21. This will result in the driven shaft 10 being operated to rotate at the same rate of speed as the drive shaft 9 through the medium of the intermeshing bevel gears that are associated with the stub shafts carried by the fly wheels and the inner end of the driven shaft 10.

However, when force is applied to the driven shaft 10, so as to cause this shaft to rotate slower than the drive shaft 9, such force will be effective in causing the beveled pinions 16 and 17 to be free to rotate about the bevel gear 15 that is carried by the forward end of the driven shaft 10.

The fly wheels 20 and 21 will then be caused to rotate on a vertical axis simultaneously with the rotation of the stub shafts 18 and 19 respectively. On account of the resistance which is offered by the fly wheels, so as to result in a change in the direction of their rotation, the power of their resistance is transmitted to the driven shaft 10.

With reference now to Figures 5 to 8 inclusive wherein there is disclosed another form of the variable speed transmission mechanism, the numeral 25 represents generally a sectional casing that includes the complementary sections 26 and 27 respectively, the same being of substantially semi-spherical shape and the free edges of each section are flanged for cooperation with the adjacent flanges of an annular band 28 that is interposed between the adjacent sections. Suitable securing bolts 29 extend through suitable openings formed in the flanged edges of the sections and the band.

A tubular housing 30 is arranged within the casing 25, the outer end thereof being flanged and secured to the annular band 28 by any appropriate fastening means shown at 31 with reference more particularly to Figures 5 and 7.

The inner or free end of this tubular housing terminates at the approximate center of the casing and carried by said end of the tubular housing is the large stationary bevel gear 32.

A tubular housing 32' has its rear end portion fitted in a suitable flanged opening formed in the front side of the endless band 28 for communication with the tubular housing 30 and the rear end portion of the drive shaft 33 extends through the alined housing that is journaled for rotation therein in any appropriate manner. The driven shaft 34 has its forward end portion journaled for rotation through the forward end of a housing 35, the latter being supported at its forward end in a flanged opening provided in the band 28 at a point diametrically opposite the flanged opening provided for the reception of the housing 32' for the drive shaft 33. The forward end of the driven shaft projects into the casing beyond the adjacent end of the housing and carried by said end of the driven shaft for rotation therewith is the socket member 36 in which is journaled for rotation the rear free end of the drive shaft 33 as is clearly shown in Figure 5.

A circular plate 37 extends from the open end of the socket member 36 and the outer peripheral edge portion of this plate is disposed laterally to form a flange 38, the inner face of which is formed with the gear teeth 39 whereby a ring gear unit is associated with the forward end of the driven shaft 34. The purpose of the annular or internal gear unit will be presently described.

A pair of diametrically opposed arms 40 and 41 respectively extend laterally from the rear end portion of the drive shaft 33 and these arms are confined within the flanged circular plate 37 and in spaced relation with respect to the internal annular gear as clearly illustrated in Figure 5. The outer ends of these laterally extending arms are disposed in a forward direction, and carry thereon the pinions 42 and 43 respectively that have engagement with the teeth 39 of the internal gear in the manner as shown in Figures 5 and 8.

This particular form of the invention furthermore includes the provision of a revoluble spider that comprises a hub or sleeve 44 that encircles the drive shaft 33 and is disposed between the stationary gear 32 and the circular plate 37 and this spider is free to revolve about the drive shaft. A spur gear 45 is formed on the rear end of the sleeve or hub 44 for disposition between the spaced pinions 42 and 43 and this spur gear meshes with the teeth of the respective pinions.

The spider further includes the provision of the radially extending arms 46 and 47 respectively, formed at the forward end of the hub or sleeve 44 and the outer extremities of these arms terminate in the pintles or stub shafts 48 and 49. Loosely mounted on the upper pintle or stub shaft 48 is the beveled pinion 50 that has engagement with the large bevel gear 32. A similar beveled pinion 51 is secured on the shaft 49 also for engagement with the bevel gear 32 in the manner as clearly illustrated in Figure 5.

A pair of complementary fly wheels 52 and 53 respectively are substantially semi-spherical in shape, and arranged within the casing 25 and enclose all the aforementioned gears.

The fly wheel 52 is formed at its central portion with a hub 54, through which the outer end of the pintle or stub shaft 48 extends and this fly wheel is loosely mounted on the pintle or stub shaft but is keyed to the adjacent beveled pinion 50 for rotation therewith.

The complementary fly wheel 53 is also formed with a central hub portion 55 for receiving the outer end of the other pintle or stub shaft 49 and this flywheel 53 is loosely mounted on this particular pintle but is keyed to the beveled pinion 51 for rotation therewith.

The adjacent edge portions of the fly wheels 52 and 53 are weighted as indicated at 56 and are spaced with respect to each other and are furthermore spaced with respect to the tubular housings 30 and 35. Furthermore each of the fly wheels is formed with the cut out portions 57 to render the same light in weight.

The operation of the variable speed transmission mechanism as disclosed in Figures 5 to 8 inclusive will now be briefly described. When the power from the motor is applied to the drive shaft 33, the driven shaft 34 will be actuated at the same rate of speed by and through the gears 42 and 43 revolving around the spur gear 45 thereby driving the internal annular gear carried by the forward end of the driven shaft. When a load or force is applied to the driven shaft 34, thereby changing the speed between the drive and driven shafts, the spur gear 45 will rotate, thereby causing the beveled pinions 50 and 51 which are loosely mounted on the stub shafts 48 and 49 respectively to revolve around the stationary gear 32 and as these pinions are keyed to the respective fly wheels, the latter will revolve about the respective stub shafts or pintles, and at the same time revolve around the stationary gear 32. On account of the resistance which the fly wheels offer to a change in the direction of their respective axes when rotating, the power of their resistance is transmitted to the driven shaft 34.

It will thus be seen from the foregoing description, that I have provided a variable speed transmission mechanism that will automatically change the speed ratio between the drive and driven shafts in a gradual and even manner coincident with the load placed upon the driven shaft. A transmission mechanism of the above mentioned character when associated with an automobile will obviate the necessity of having to provide any mechanically operated gear shifting mechanism and will also do away with the usual clutch. Furthermore, an automobile embodying a variable speed transmission mechanism of the present character will be capable of being started or stopped without the danger of the motor stalling.

Also an automobile will be permitted to travel at a high gear speed when on a level road or surface and will change to any lower speed ratio as the engine requires when ascending hills or in starting the car.

It is of course to be understood that a mechanically operated mechanism of any conventional construction is to be employed for the purpose of enabling the driven shaft to rotate in the reverse direction whenever necessary, such as for example, when an automobile is to be moved rearwardly.

The transmission mechanism may also be equally as well used upon a lathe, milling machine or any other machine where the cutting speed varies unless the belt or gears are changed in order to keep the cutting speed as nearly constant as possible. The present transmission mechanism will at all times maintain a constant cutting speed without the attention of the operator, thus insuring longer life in the cutting tools or bits, and making possible better and more speedy production.

While I have shown the preferred embodiment of my invention it is to be understood that various changes in the size, shape and arrangement of parts may be resorted to without departing from the spirit of the invention and the scope of the appended claims.

Having thus described the invention, what I claim as new and desire to secure by Letters Patent is:—

1. In a variable speed transmission mechanism, a casing, a drive shaft extending into one side thereof, a driven shaft extending into the opposite side of the casing, an internal gear secured on the inner end of the driven shaft for rotation therewith, arms extending laterally from the inner end of the drive shaft, pinions carried by the outer ends of the arms for engagement with the annular or internal gear to drive the driven shaft with the same speed as the drive shaft, fly wheel controlled means within the casing for varying the speed of rotation of the driven shaft coincident with the load placed thereon, said means including a spider loosely mounted on the inner end of the drive shaft, a spur gear formed on the spider for engagement with the driving pinions, laterally extending stub shafts associated with the spider, and opposed fly wheels adapted for rotation on the outer ends of the respective stub shafts.

2. In a variable speed transmission mechanism, a casing, a drive shaft extending into one side thereof, a driven shaft extending into the opposite side of the casing, an internal gear secured on the inner end of the driven shaft for rotation therewith, arms extending laterally from the inner end of the drive shaft, pinions carried by the outer ends of the arms for engagement with the annular or internal gear to drive the driven shaft with the same speed as the drive shaft, fly wheel controlled means within the casing for varying the speed of rotation of the driven shaft coincident with the load placed thereon, said means including a spider loosely mounted on the inner end of the drive shaft, a spur gear formed on the spider for engagement with the driving pinions, laterally extending stub shafts associated with the spider, opposed fly wheels adapted for rotation on the outer ends of the respective stub shafts, a stationary gear arranged vertically in the casing, and pinions on the stub shafts meshing with the stationary gear to effect a change in the axis of rotation of the respective opposed fly wheels.

In testimony whereof I affix my signature.

CUMMINGS GARDNER.